(12) United States Patent
Eisa et al.

(10) Patent No.: US 9,731,604 B2
(45) Date of Patent: Aug. 15, 2017

(54) DISTRIBUTED AUXILIARY POWER UNIT (71) Applicant: General Electric Company, Schenectady, NY (US)

(72) Inventors: Hafiz Hassan Eisa, Erie, PA (US); Mike Meltser, Buffalo Grove, IL (US); Alessandro Simoes Correa, Belo Horizonte (BR)

(73) Assignee: General Electric Company, Schenectady, NY (US)

( * ) Notice: Subject to any disclaimer, the term of this patent is extended or adjusted under 35 U.S.C. 154(b) by 301 days.

(21) Appl. No.: 14/327,652

(22) Filed: Jul. 10, 2014

(65) Prior Publication Data

US 2015/0035278 A1 Feb. 5, 2015

Related U.S. Application Data

(60) Provisional application No. 61/861,040, filed on Aug. 1, 2013.

(51) Int. Cl.
| | |
|---|---|
| *B61D 43/00* | (2006.01) |
| *B60L 1/00* | (2006.01) |
| *B60L 1/02* | (2006.01) |
| *B60L 11/12* | (2006.01) |
| *B60L 11/18* | (2006.01) |
| *F01N 5/02* | (2006.01) |

(52) U.S. Cl.
CPC .............. *B60L 1/003* (2013.01); *B60L 1/02* (2013.01); *B60L 11/123* (2013.01); *B60L 11/1862* (2013.01); *B60L 2200/26* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2240/662* (2013.01); *B60L 2270/145* (2013.01); *F01N 5/02* (2013.01); *Y02T 10/6217* (2013.01); *Y02T 10/7005* (2013.01); *Y02T 10/705* (2013.01); *Y02T 10/7044* (2013.01); *Y02T 10/7291* (2013.01); *Y02T 90/16* (2013.01)

(58) Field of Classification Search
CPC ....... B60L 1/02; B60L 11/123; B60L 11/1862
USPC ............................................. 290/3
See application file for complete search history.

(56) References Cited

U.S. PATENT DOCUMENTS

| | | | |
|---|---|---|---|
| 4,762,170 A | | 8/1988 | Nijjar et al. |
| 5,132,584 A | * | 7/1992 | Sasamoto ............... F16F 15/02 310/51 |
| 6,470,844 B2 | | 10/2002 | Biess |
| 6,636,798 B2 | | 10/2003 | Biess et al. |
| 6,786,209 B2 | | 9/2004 | Stewart |

(Continued)

FOREIGN PATENT DOCUMENTS

| | | |
|---|---|---|
| EP | 1 339 981 B1 | 2/2009 |
| WO | 2006/020667 A2 | 2/2006 |

*Primary Examiner* — Tulsidas C Patel
*Assistant Examiner* — Thomas Quigley
(74) *Attorney, Agent, or Firm* — Global Patent Operation; John A. Kramer (57) ABSTRACT

Various methods and systems are provided for an auxiliary power unit. In one embodiment, an auxiliary power unit comprises a plurality of independent modules configured to be installed in respective different locations within a rail vehicle or other vehicle. Each module of the plurality of independent modules is configured to carry out one or more respective functions of the auxiliary power unit for providing auxiliary power in the vehicle.

26 Claims, 6 Drawing Sheets

(56) References Cited

U.S. PATENT DOCUMENTS 6,928,972 B2 8/2005 Biess et al.
2006/0125319 A1* 6/2006 King .................... B60L 7/06
307/10.1

* cited by examiner

DISTRIBUTED AUXILIARY POWER UNIT

RELATED APPLICATIONS

This application claims priority to U.S. Provisional Application No. 61/861,040, filed Aug. 1, 2013, the entire contents of which is herein incorporated by reference for all purposes.

FIELD

Embodiments of the subject matter disclosed herein relate to an auxiliary power unit installed in a vehicle, for example.

BACKGROUND

Various efforts have been made to improve the fuel efficiency and emissions of vehicles. For example, an auxiliary power unit (APU) may be included in a vehicle. The APU may be activated to maintain engine coolant temperature during a non-moving condition of the vehicle. By keeping the coolant at a desired temperature via the APU, the primary engine of the vehicle may be shut down during the non-moving operation to conserve fuel. Further efforts to increase fuel efficiency and/or reduce emissions have included down-sizing of the vehicle. However, standard APUs may comprise a large amount of packaging space in the vehicle, and such down-sized vehicles may not be able to accommodate an APU.

BRIEF DESCRIPTION

In one embodiment, an auxiliary power unit comprises a plurality of independent modules configured to be installed in respective different locations within a vehicle. Each module of the plurality of independent modules is configured to carry out one or more respective functions of the auxiliary power unit for providing auxiliary power in the vehicle.

In this way, the auxiliary power unit may be configured with a plurality of modules that can be distributed throughout a rail vehicle or other vehicle, rather than packaged together in a single location. By doing so, the various modules of the auxiliary power unit may be positioned at different locations each having a smaller packaging space, facilitating the use of the auxiliary power unit even in a down-sized vehicle. Further, the location where each module is installed may be optimized for that module to reduce wear on the module and reduce complexity in the coupling between the auxiliary power unit and various components of the vehicle. For example, the control unit of the auxiliary power unit may be placed in a location that receives a relatively small amount of vibrations, reducing the wear on the control unit and reducing the packaging and extra vibration-dampening components used to keep the control unit stable. Further still, by providing a modular auxiliary power unit, each module may be selected to have a specification tailored for a particular application. For example, a first vehicle may have an auxiliary power unit with a module having a different rating (e.g., horsepower, pumping capacity, etc.) than that module in an auxiliary power unit installed in a second vehicle. Additionally, the modular nature of the auxiliary power unit may enable a module to be replaced, for example if the module is degraded or if a module of a different rating is desired, without having to replace the entire auxiliary power unit.

It should be understood that the brief description above is provided to introduce in simplified form a selection of concepts that are further described in the detailed description. It is not meant to identify key or essential features of the subject matter. Furthermore, the subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various embodiments of an auxiliary power unit (APU) that may provide supplementary power when a primary power-generator is inactivated. For example, the auxiliary power unit described herein may provide additional power to maintain engine coolant temperature and provide battery charge when a primary engine of a rail vehicle or other vehicle is not operating.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include mining equipment, marine vessels, on-road transportation vehicles, off-highway vehicles (OHV), and locomotive or other rail vehicles. For clarity of illustration, a locomotive is provided as an example of a mobile platform supporting a system incorporating an embodiment of the invention.

Figure 1:
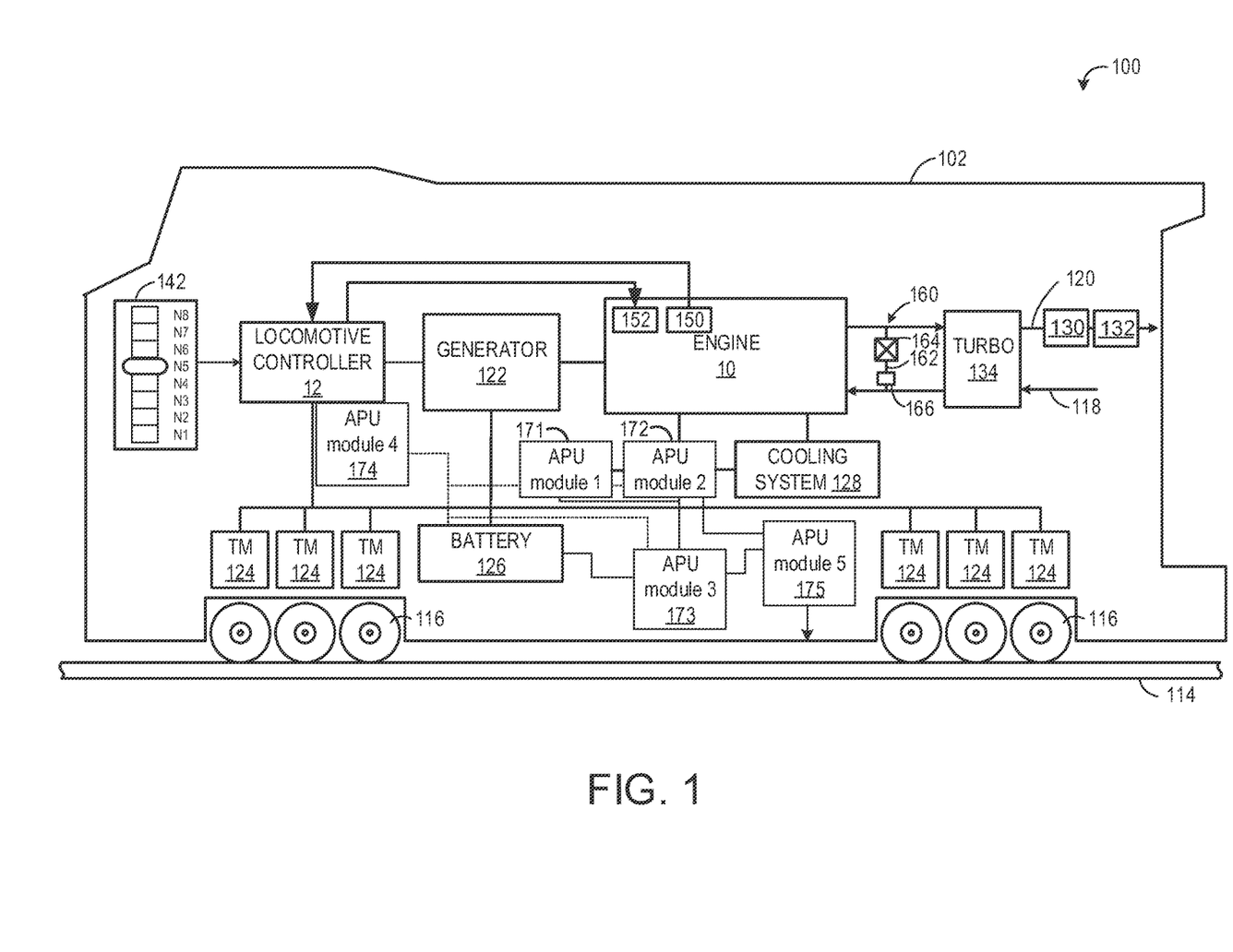
FIG. 1 shows a schematic diagram of a rail vehicle or other vehicle with a primary engine and an auxiliary power unit according to an embodiment of the invention.

Before further discussion of the approach for distributing various modules of an auxiliary power unit, an example of a platform is disclosed in which the APU may be installed in a vehicle, such as a rail vehicle or other vehicle. For example, FIG. 1 shows a block diagram of an embodiment of a vehicle system 100, herein depicted as a rail vehicle 102 (e.g., a locomotive), configured to run on a rail 114 via a plurality of wheels 116. As depicted, the rail vehicle 102 includes an engine 10. In other non-limiting embodiments, the engine 10 may be a stationary engine, such as in a power-plant application, or an engine in a marine vessel or off-highway vehicle propulsion system as noted above. In one example, engine 10 may be a diesel engine. However, in alternate embodiments, alternate engine configurations may be employed, such as a gasoline engine, a biodiesel engine, a natural gas engine, or a gas turbine engine (turbojet, turbofan, turboprop, turboshaft), for example.

The engine 10 receives intake air for combustion from an intake passage 118. The intake passage 118 receives ambient air from an air filter (not shown) that filters air from outside of the rail vehicle 102. Exhaust gas resulting from combustion in the engine 10 is supplied to an exhaust passage 120. Exhaust gas flows through the exhaust passage 120, and out of an exhaust stack (not shown) of the rail vehicle 102.

In one embodiment, the rail vehicle 102 is a diesel-electric vehicle. As depicted in FIG. 1, the engine 10 is coupled to an electric power generation system, which includes an alternator/generator 122 and electric traction motors 124. For example, the engine 10 is a diesel engine that generates a torque output that is transmitted to the generator 122 which is mechanically coupled to the engine 10. In another example, the engine 10 may be a dual fuel engine configured to combust multiple types of fuel, such as diesel, gasoline, natural gas, ethanol, or other suitable fuel types.

The generator 122 produces electrical power that may be stored and applied for subsequent propagation to a variety of downstream electrical components. As an example, the generator 122 may be electrically coupled to a plurality of traction motors 124 and the generator 122 may provide electrical power to the plurality of traction motors 124. As depicted, the plurality of traction motors 124 are each connected to one of a plurality of wheels 116 to provide tractive power to propel the rail 102. One example locomotive configuration includes one traction motor per wheel. As depicted herein, six pairs of traction motors correspond to each of six pairs of wheels of the locomotive.

Rail vehicle 102 may further include a battery 126 coupled to alternator/generator 122. Battery 126 may receive and store electricity generated by alternator/generator 122 and distribute the stored electricity to various electrical components of the rail vehicle.

Rail vehicle 102 may further include a turbocharger 134 arranged between the intake passage 118 and the exhaust passage 120. The turbocharger 134 increases air charge of ambient air drawn into the intake passage 118 in order to provide greater charge density during combustion to increase power output and/or engine-operating efficiency. The turbocharger 134 may include a compressor (not shown) which is at least partially driven by a turbine (not shown). While in this case a single turbocharger is included, the system may include multiple turbine and/or compressor stages. Further, in some embodiments, a wastegate may be provided which allows exhaust gas to bypass the turbocharger 134. The wastegate may be opened, for example, to divert the exhaust gas flow away from the turbine. In this manner, the rotating speed of the compressor, and thus the boost provided by the turbocharger 134 to the engine 10 may be regulated.

The rail vehicle 102 further may include an exhaust gas recirculation (EGR) system 160, which routes exhaust gas from the exhaust passage 120 upstream of the turbocharger 134 to the intake passage downstream of the turbocharger 134. The EGR system 160 includes an EGR passage 162 and an EGR valve 164 for controlling an amount of exhaust gas that is recirculated from the exhaust passage 120 of engine 10 to the intake passage 118 of engine 10. By introducing exhaust gas to the engine 10, the amount of available oxygen for combustion is decreased, thereby reducing the combustion flame temperatures and reducing the formation of nitrogen oxides (e.g., NOx). The EGR valve 164 may be an on/off valve controlled by the engine controller 12, or it may control a variable amount of EGR, for example. The EGR system 160 may further include an EGR cooler 166 to reduce the temperature of the exhaust gas before it enters the intake passage 118. As the EGR cooler may be exposed to untreated exhaust gas, it can become plugged with particulates, reducing its effectiveness. Thus, it may utilize regeneration to remove soot (or other particulate matter) that may foul the cooler. As depicted in the non-limiting example embodiment of FIG. 2, the EGR system 160 is a high-pressure EGR system. In other embodiments, the rail vehicle 102 may additionally or alternatively include a low-pressure EGR system, routing EGR from a location downstream of the turbocharger to a location upstream of the turbocharger. Additionally, the EGR system may be a donor cylinder EGR system where one or more cylinders provide exhaust gas only to the EGR passage, and then to the intake.

The rail vehicle 102 includes an exhaust gas treatment system coupled in the exhaust passage to reduce regulated emissions. In one example embodiment, the exhaust gas treatment system may include a diesel oxidation catalyst (DOC) 130 and a diesel particulate filter (DPF) 132. The DPF 132 is configured to trap particulates, also known as particulate matter (an example of which is soot), produced during combustion, and may be comprised of ceramic, silicon carbide, or any suitable material.

In other embodiments, the exhaust gas treatment system may additionally include a selective catalytic reduction (SCR) catalyst, three-way catalyst, $NO_x$ trap, various other emission control devices or combinations thereof. In some embodiments, the exhaust gas treatment system may be positioned upstream of the turbocharger, while in other embodiments, the exhaust gas treatment system may be positioned downstream of the turbocharger.

Rail vehicle 102 may further include a throttle 142 coupled to engine 10 to indicate power levels. In this embodiment, the throttle 142 is depicted as a notch throttle. However, any suitable throttle is within the scope of this disclosure. Each notch of the notch throttle 142 may correspond to a discrete power level. The power level indicates an amount of load, or engine output, placed on the locomotive and controls the speed at which the locomotive will travel. Although eight notch settings are depicted in the example embodiment of FIG. 1, in other embodiments, the notch throttle may have more than eight notches or less than eight notches, as well as notches for idle and dynamic brake modes.

Rail vehicle 102 further includes an engine controller 12 to control various components related to the rail vehicle 102. As an example, various components of the vehicle system may be coupled to the engine controller 12 via a communication channel or data bus. In one example, the engine controller 12 includes a computer control system. The engine controller 12 may additionally or alternatively include a memory holding non-transitory computer readable storage media (not shown) including code for enabling on-board monitoring and control of locomotive operation.

Engine controller 12 may receive information from a plurality of sensors and may send control signals to a plurality of actuators. The engine controller 12, while overseeing control and management of the rail vehicle 102, may be configured to receive signals from a variety of engine sensors 150, as further elaborated herein, in order to determine operating parameters and operating conditions, and correspondingly adjust various engine actuators 152 to control operation of the rail vehicle 102. For example, the engine controller 12 may receive signals from various engine sensors 150 including, but not limited to, engine speed, engine load, intake manifold air pressure, boost pressure, exhaust pressure, ambient pressure, ambient temperature, exhaust temperature, particulate filter temperature, particulate filter back pressure, etc. Correspondingly, the engine controller 12 may control the rail 102 by sending commands to various components such as the traction motors 124, the alternator/generator 122, cylinder valves, fuel injectors, the notch throttle 142, etc. Other actuators may be coupled to various locations in the locomotive.

Rail vehicle 102 may further include a cooling system 128 configured to cool engine 10. Cooling system 128 may include a pump, coolant lines, and at least one heat exchanger. The cooling system pump may route coolant through coolant lines to the engine. Engine heat transferred to the coolant in the engine may be dissipated to atmosphere and/or the vehicle cabin via the heat exchanger.

Rail vehicle 102 also includes an auxiliary power unit (APU) including a plurality of modules. For example, as shown in FIG. 1, the APU includes a first APU module 171, a second APU module 172, a third APU module 173, a fourth APU module 174, and a fifth APU module 175. Each module of the plurality of modules is configured to be located in a different location in rail vehicle 102 or another vehicle.

The APU may provide additional power to charge battery 126 and warm coolant in cooling system 128 and/or warm engine lubricating oil when engine 10 is shutdown. As such, the APU may include an engine module to produce energy usable by a heater module and a pump module. The APU may further include a battery, as part of the heater module or pump module for example, as well as a control unit module to direct activation of the engine, heater, and/or pump, and an exhaust module to route exhaust from the engine and/or heater to atmosphere.

The APU modules may each be located in a suitable location. In the example shown in FIG. 1, the first APU module 171 and the second APU module 172 may each be located near cooling system 128 and engine 10. The third APU module 173 may be located away from the first and second APU modules but may be in communication with the other APU modules (e.g., the first, second, fourth, and fifth modules). The fourth APU module 174 may be located near engine controller 12. The fifth APU module 175 may be located near the first and third APU modules. However, the locations illustrated in FIG. 1 are provided as an example, and other locations are possible.

The location of each module may be selected based on a variety of factors. For example, each module may be positioned based on the size of the module and available packaging space in the rail vehicle or other vehicle. Additionally, each module may be positioned based on the functionality of that module. For example, a heater module may be configured to maintain a temperature of the engine coolant and/or lubricating oil, and as such the heater module may be positioned at a location in contact with one or more coolant and/or oil lines. Similarly, a pump module may be positioned near the heater module and in contact with the one or more coolant and/or oil lines. Furthermore, each module may be positioned based on the vibration tolerance of that module. For example, the control unit module may be less tolerant of vibrations than the heater module, and thus may be positioned in a more stable, less vibration-generating region of vehicle than the heater module.

In the example illustrated in FIG. 1, the first APU module 171 is a pump module in contact with one or more oil and coolant lines. The second APU module 172 is a heater module also in contact with one or more oil and coolant lines. In this way, the first APU module 171 may pump oil and/or coolant to the second APU module 172, which may heat the oil and/or coolant. The third APU module 173 is an engine module. The engine module may combust fuel in order to generate a torque output that is transmitted to an alternator of the engine module. The alternator produces electrical power that may be stored and applied for subsequent propagation to a variety of downstream electrical components, such as vehicle battery 126. Further, the fifth APU module 175 is an exhaust module configured to route exhaust gas from the engine module and/or the heater module to atmosphere. As such, the exhaust module may be in communication with the heater module and the engine module.

The fourth APU module 174 is a control unit module. The control unit module may receive signals from a variety of components and sensors of the APU and/or rail vehicle 102 or other vehicle, and may send signals controlling a variety of actuators of the APU and/or rail vehicle 102. For example, the control unit module may activate the engine module, heater module, and pump module in response to an indication that the primary engine (e.g., engine 10) has shut down. Further, as will be elaborated in more detail below, the control unit module may assess the state of charge of battery 126 and may disconnect the battery 126 from the engine module when battery charge is full, for example. As shown in FIG. 1, the control unit module is in communication with the heater module, pump module, and engine module.

The APU also includes a battery to store energy generated by the alternator of the APU engine module. The APU battery may be a suitable type of battery, such as a 12V DC lead-acid battery, a lithium-ion battery, or other rechargeable battery, and at least in some embodiments, may include a battery charging circuit. In one example, the APU battery may be included in the pump module (e.g., first APU module 171). The battery may provide energy to power the pump, and thus by including both the pump and battery in the same module, electrical connections among the modules of the APU may be minimized. In another example, the APU battery may be included in the heater module (e.g., second APU module 172), or in the engine module. In a still further example, the APU battery may be included in a separate APU battery module. Other configurations are possible.

While FIG. 1 illustrates an APU having five separate modules, is some embodiments the APU may include more or fewer modules. For example, in an embodiment the heater module and pump module may be included as a single module. In another embodiment, the engine and alternator may be configured as separate modules rather than a single module. In a further embodiment, the pump may be included in the engine module or in an APU battery module.

As used herein, the APU modules being positioned at different locations in a vehicle may include the modules being contained in separate housings (e.g., the modules are not located in the same housing). Further, the different locations may be distal to one another, that is, the different locations may not be proximate but may instead be separated by at least a threshold distance. The different locations may be subject to different vehicle conditions, for example the different locations may be subject to different vibration levels, different temperatures, etc. The modules are interrelated, e.g., the modules may communicate with each other and/or one or more non-APU components (such as the vehicle controller) and may be operably coupled in order to carry out one or more common functions (e.g., generating and distributing energy when the primary engine is shutdown). Thus, the modules may be configured for at least one of intercommunication with one another or operable coupling with one another for carrying out the one or more respective functions described above.

Figure 2:
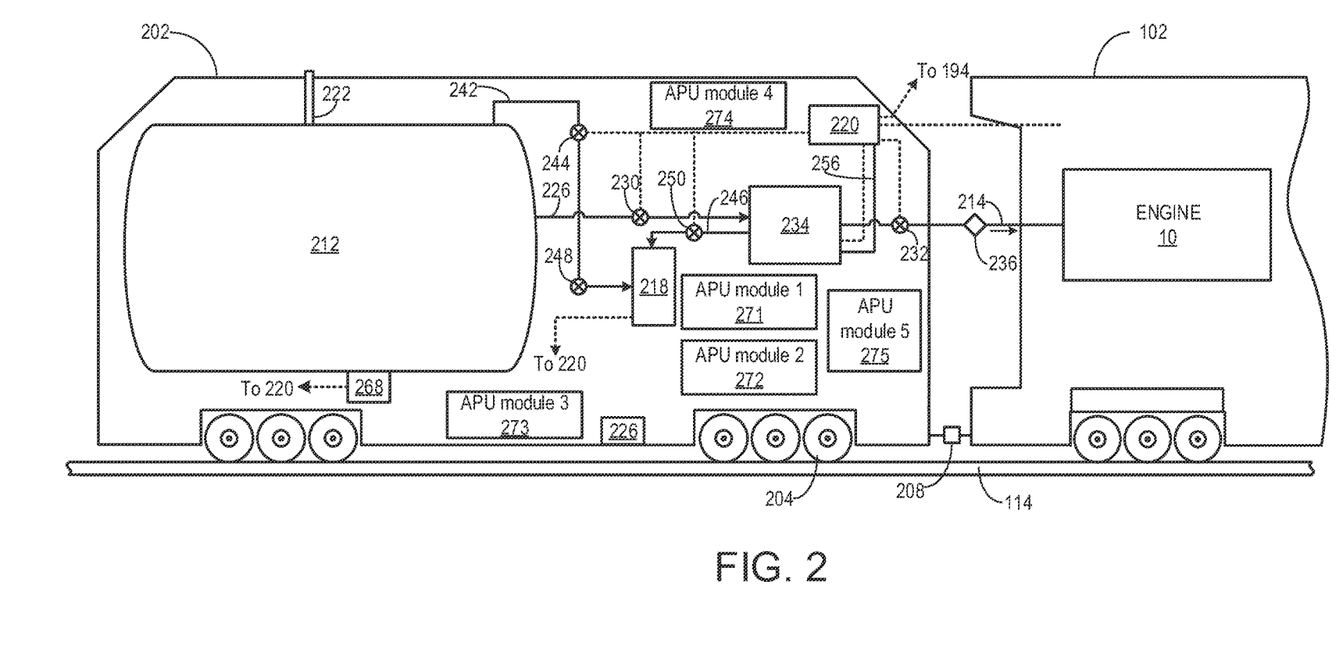
FIG. 2 shows a schematic diagram of a second rail vehicle or other vehicle coupled to the rail vehicle or other vehicle of FIG. 1.

The rail vehicle 102 or other vehicle may be in communication with one or more additional rail vehicle or other vehicles. For example, the rail vehicle 102 or other vehicle may be a locomotive in communication with a tender configured to provide fuel to engine 10 from a remote fuel tank. FIG. 2 illustrates a second rail vehicle 202 or other vehicle (e.g., a tender car) which may be removably coupled to the rail vehicle 102 or other vehicle. Second rail vehicle 202 includes axles/wheels 204 configured to travel along rail 114. Second rail vehicle 202 further includes a mechanical coupling mechanism 208 that removably couples the second rail vehicle 202 to the first rail vehicle or other vehicle for linked movement thereof. In other examples, the second rail vehicle 202 may include a second coupling mechanism (not shown) that may removably couple the vehicle to another rail vehicle or other vehicle, such as a freight car.

The second rail vehicle 202 is configured to carry one or more fuel storage tanks. In one embodiment, as shown in FIG. 2, the second rail vehicle 202 includes an on-board cryogenic LNG storage tank 212 for storing LNG. In one example, the LNG storage tank 212 may take the form of a vacuum-jacketed pressure vessel that stores LNG at pressures ranging from approximately 50 kPa to approximately 1,700 kPa. It will be appreciated that to maintain LNG in a liquid state, the LNG may be stored at a temperature of approximately −260 degrees Celsius or lower. In some examples, as shown in FIG. 2, the second rail vehicle 202 includes a cryogenic unit 268 for helping maintain the LNG within desired temperature and pressure ranges. In other examples, the second rail vehicle 202 may not include the cryogenic unit 268.

Even with efficient insulation and cryogenic refrigeration equipment, heat typically leaks into the LNG storage tank 212 and causes vaporization of portions of the LNG into boil-off gas. In one example, as shown in FIG. 2, portions of such boil-off gas accumulating in the LNG storage tank 212 are also delivered to and stored in an on-board reservoir 218. In alternate examples, the second rail vehicle 202 may not include the reservoir 218. It will also be appreciated that the storage tank 212 may have various sizes and configurations and may be removable from the second rail vehicle 202. Further, as shown in FIG. 2, the storage tank 212 is configured to receive LNG from an external refueling station via port 222. In alternate examples, the storage tank 212 may revive LNG through another port or location on the storage tank 212.

The LNG storage tank 212 may supply LNG via cryogenic LNG fluidic coupling 226 and one or more valves 230 to a regasification unit 234. The regasification unit 234 converts the LNG into gaseous natural gas, or vaporizes the LNG, by the application of heat to the LNG. The gaseous natural gas is then delivered to the primary engine 10 of the rail vehicle 102 to power the primary engine 10. As shown in FIG. 2, the gaseous natural gas is delivered to the primary engine 10 via fluidic coupling 214 and one or more control valves 232. Additional control valves may be positioned in the gaseous natural gas fluidic coupling 214 to direct gaseous natural gas to additional locomotives or rail cars. The gaseous natural gas fluidic coupling 214 further includes a detachable interface coupling 236 that enables the second rail vehicle 202 to be decoupled from the rail vehicle 102.

In another non-limiting example depicted in FIG. 2, the reservoir 218 on board the second rail vehicle 202 receives boil-off gas from the storage tank 212 via boil-off gas fluidic coupling 242 and control valve 248. In another non-limiting example and as depicted in FIG. 2, the reservoir 218 also receives gaseous natural gas produced by the regasification unit 234 via gaseous natural gas fluidic coupling 246 and one or more control valves 250. In this manner, the regasification unit supplies gaseous natural gas to the reservoir 218 to, for example, maintain the reservoir at a desired storage level.

Controller 220 on board the second rail vehicle 202 controls various components on board the second rail vehicle 202, such as the regasification unit 234, cryogenic unit 268, control valves, and/or other components, by sending commands to such components. On-board controller 220 may also monitor fuel tender operating parameters in active operation, idle and shutdown states. Such parameters may include, but are not limited to, pressure and temperature of the LNG storage tank 212, pressure and temperature of the regasification unit 234, heating fluid temperature and pressure, ambient air temperature, and the like. In one example, computer readable storage media configured in the on-board controller 220 may execute code to auto-stop, auto-start, operate and/or tune the regasification unit 234 in response to one or more control system routines. The computer readable storage media may also execute code to transmit to and receive communications from controller 12 on board the first rail vehicle 102.

Second rail vehicle 202 may also include an APU having a plurality of modules. As shown, the APU of second rail vehicle 202 includes five modules, first through fifth APU modules 271, 272, 273, 274, and 275, respectively, similar to the modules of the APU of the first rail vehicle 102. As second rail vehicle 202 does not include a power-generating engine for traction but instead is configured as a fuel storage car, the APU of the second rail vehicle may have alternate functions than the APU of the first rail vehicle 102. For example, the APU of second rail vehicle 202 may be used to power regasification unit 234 or otherwise provide heat to vaporize the LNG stored in the storage tank 212, provide power to cryogenic unit 268, etc. As such, the APU of the second rail vehicle 202 may be configured with a larger engine, more powerful heater, or other, different configuration than the APU of the first rail vehicle.

Figure 3:
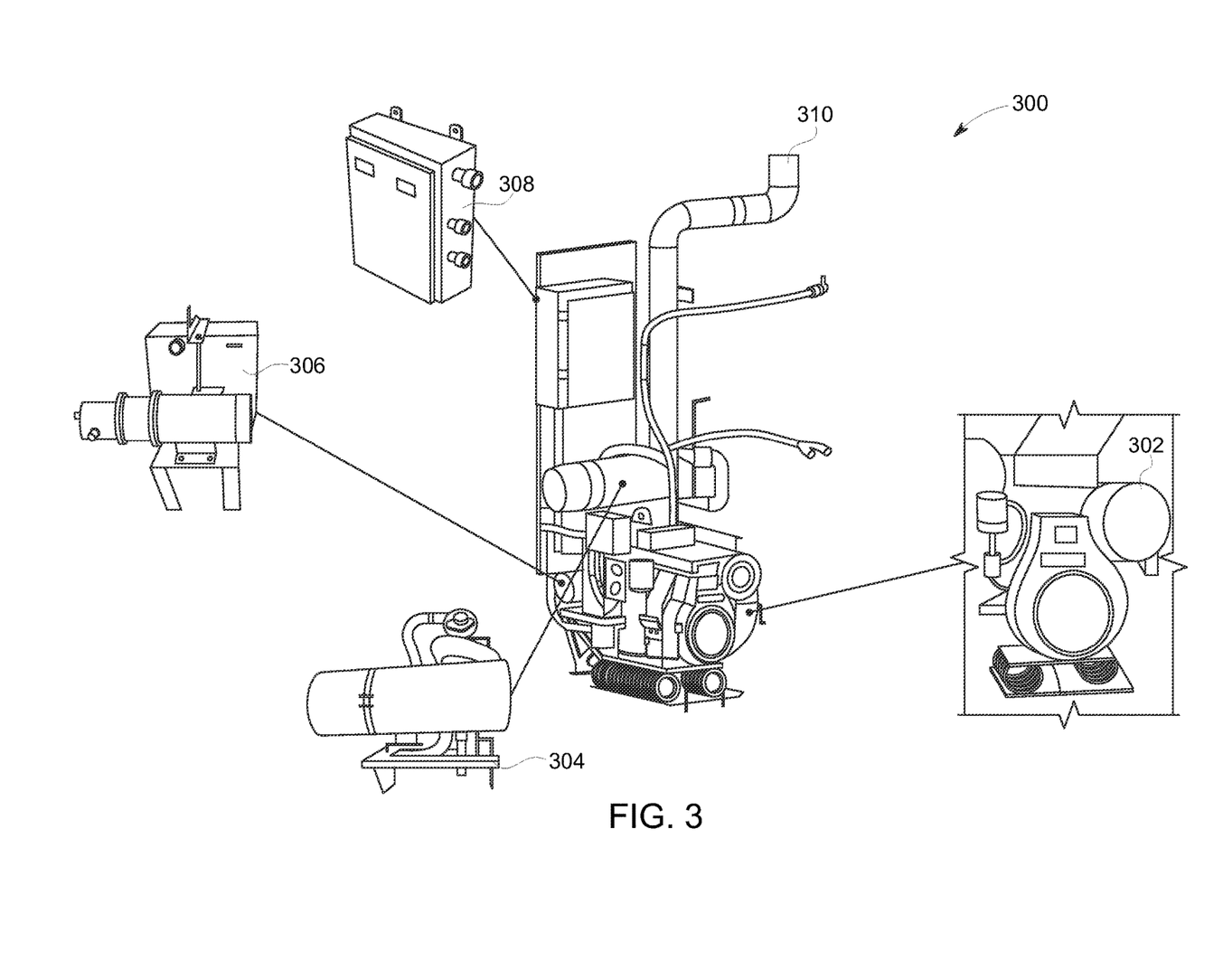
FIG. 3 shows an auxiliary power unit including a plurality of modules according to an embodiment of the invention.

FIG. 3 shows an example auxiliary power unit (APU) 300 including a plurality of modules. APU 300 may be a non-limiting example of the APU installed in the first rail vehicle 102 and/or the second rail vehicle 202. APU 300 includes a plurality of modules configured to be packaged as a single unit, or to be distributed to different locations when installed in a vehicle. APU 300 includes an engine module 302. Engine module 302 includes an engine, configured to combust fuel such as diesel fuel. In one example, the engine may have an output in a range of 5-15 horsepower (HP) and/or 5-10 kilowatt (KW). For example, the engine may have an output of 9.5 HP and/or 7.5 KW. In another example, the engine may have an output of 12 HP and/or 10 KW. In a still further example, the engine may have an output of 7 HP and/or 6 KW. Energy produced during combustion may be translated into electrical energy via an alternator, which is also included as part of engine module 302. The alternator may produce power of suitable voltage and amperage, such as in the range of 12V-220V and/or in the range of 40 A-400 A. In one example, the alternator may produce DC power at 72V and 80 A. In another example, the alternator may produce DC power at 90V and 100 A. In a still further example, the alternator may produce DC power at 40V and 45 A. Further, one or more vibration isolators may be mounted to the engine and/or alternator of the engine module 302. The vibration isolators may isolate the engine from vibrations produced while the vehicle in which the APU is mounted is operating, and may include one or more springs.

APU 300 also includes a heater module 304. The heater may have an output in a range of 20-50 KW, such as 25 KW, 30 KW, or other levels, such as 5 KW. The heater module 304 may be powered by the engine and/or alternator of engine module 302, and may be configured to maintain engine coolant and/or lubricating oil at a designated temperature. A pump module 306 of APU 300 may pump coolant and/or lubricating oil to or from the heater module 304. The pump module 306 may include a battery in some examples, and as such may be referred to as a pump/battery module. An exhaust module 310 may route exhaust produced from the engine module 302 and/or heater module 304 to atmosphere.

Engine module 302, heater module 304, and/or pump module 306 may be controlled by control module 308. Control module 308 may include instructions stored thereon and execute the instructions to carry out one or more methods or control routines described below as well as others not anticipated. For example, control module 308 may include computer readable storage media configured to execute code to activate the engine module 302, heater module 304, and/or pump module 306 when indicated.

Figure 4:
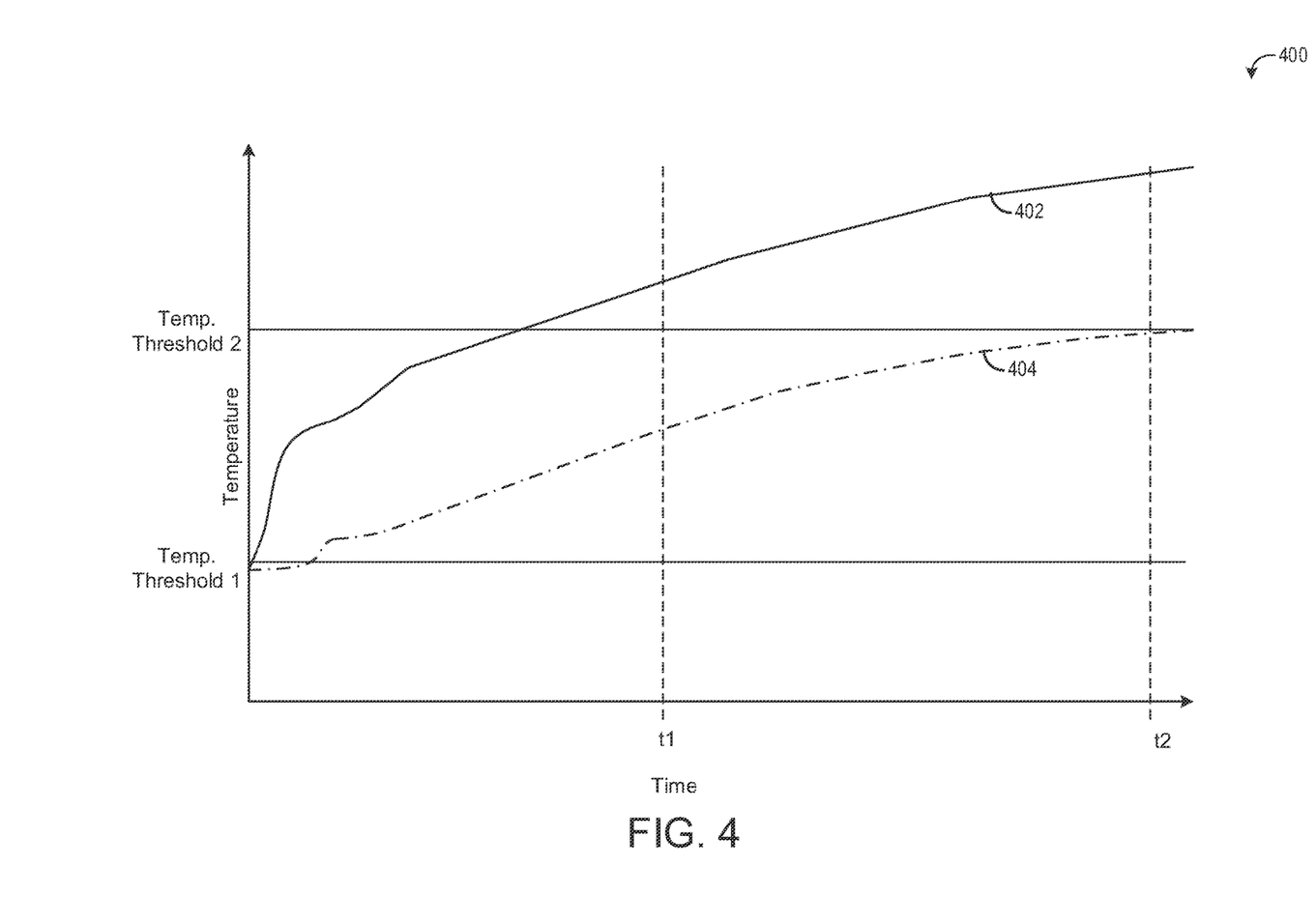
FIG. 4 shows a graph illustrating a working range of an auxiliary power unit according to an embodiment of the invention.

As explained previously, the APU 300 may be configured to maintain engine coolant and/or lubricating oil at a desired temperature during conditions where the primary engine of the vehicle in which the APU is installed is shutdown. FIG. 4 is a graph 400 illustrating coolant temperature maintained by an APU, such as APU 300. Time is depicted along the horizontal axis, while temperature is depicted along the vertical axis. Curve 402 illustrates the temperature of coolant at the coolant outlet, while curve 404 illustrates the temperature of coolant at the APU. The differences between the two curves are due to the respective temperature sensors being located at different positions. Responsive to a shutdown of a primary engine, the APU may be activated to maintain coolant (e.g., water) within a desired range, such as between 20° C. and 80° C. As shown in FIG. 4, the coolant may be maintained between a first temperature threshold (e.g., 35° C.) and a second temperature threshold (e.g., 50° C.). However other temperature ranges are possible, such as between 30° C. and 45° C.

In addition to heating coolant, the APU may also heat lubricating oil. For example, at time t1 of graph 400, lubricating oil may reach a first threshold temperature. At time t2, the oil may reach a second, higher threshold temperature. Also at time t2, the coolant has reached the second threshold temperature. As such, the heater of the APU is deactivated at time t2, although the pump may continue to operate to cool the heater.

Figure 5:
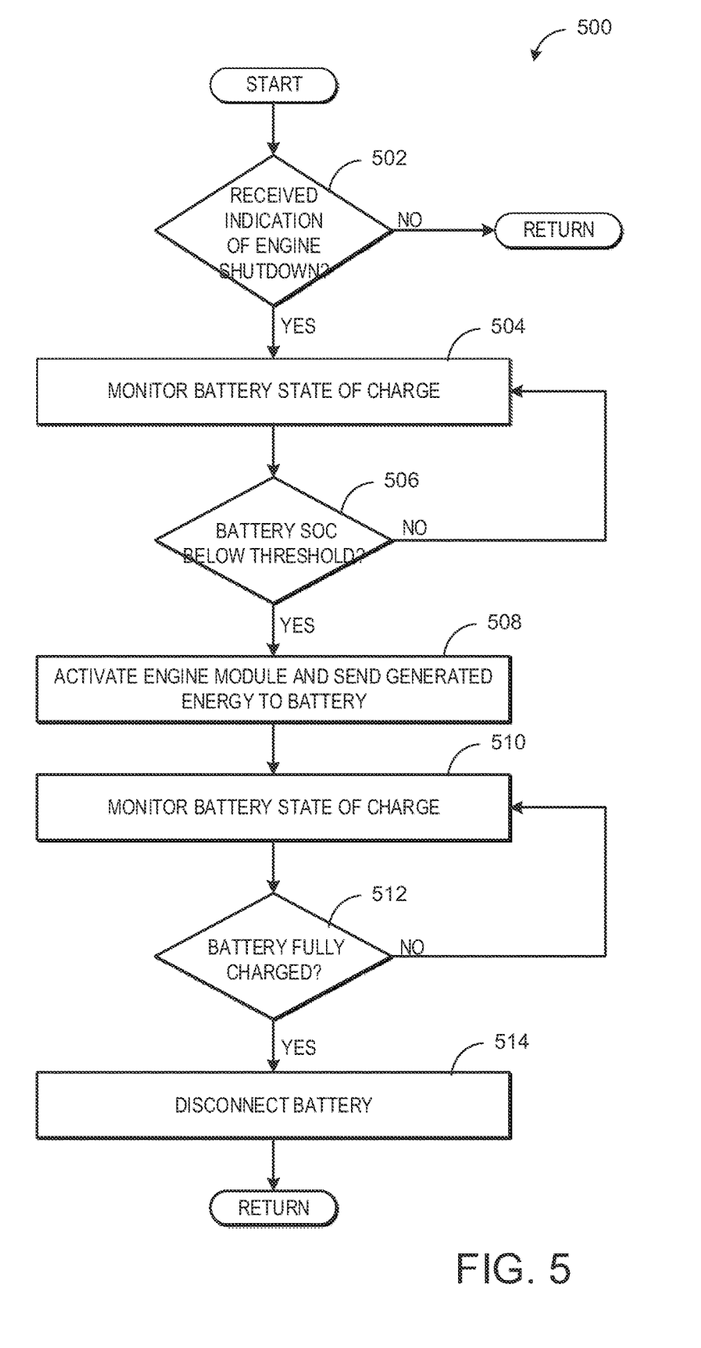
FIGS. 5-6 are flow charts illustrating methods for operating an auxiliary power unit according to embodiments of the invention.
Figure 6:
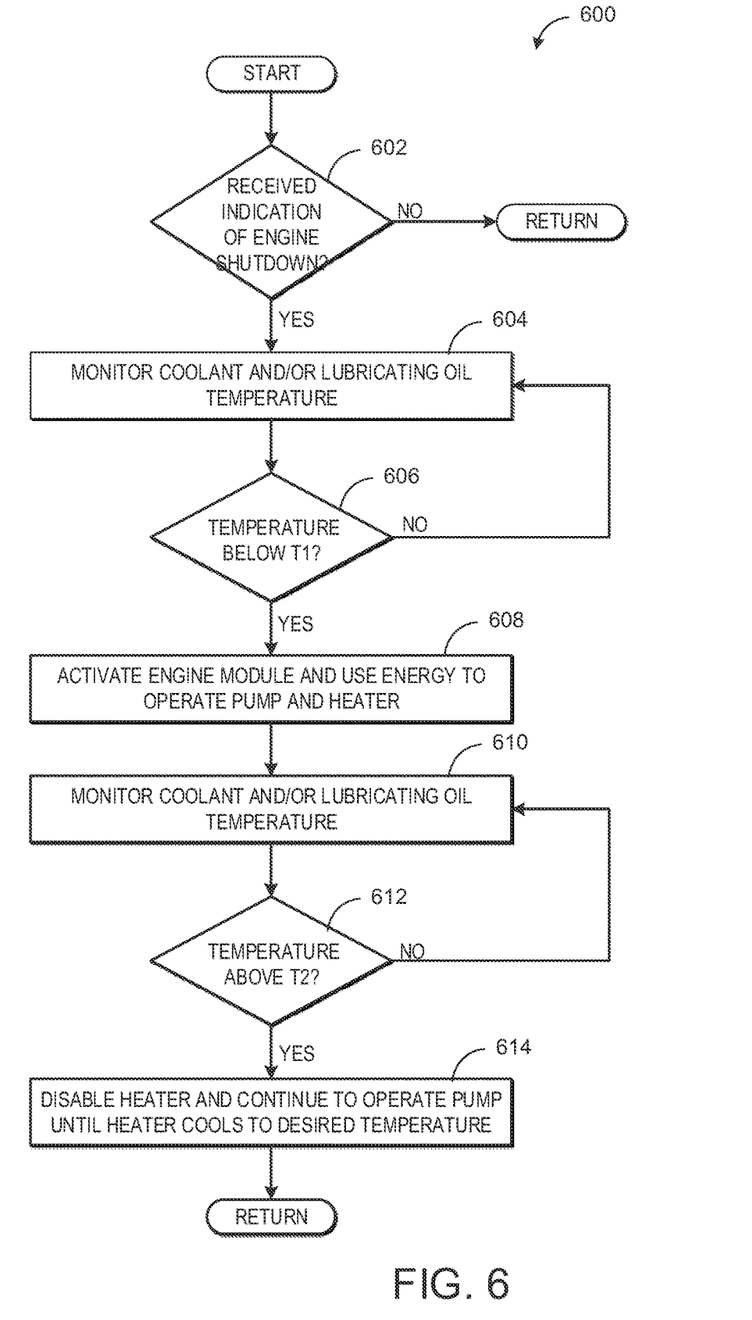

Turning now to FIGS. 5-6, example methods for controlling activation of one or more modules of an APU, such as APU 300 of FIG. 3, are illustrated. Specifically, FIG. 5 illustrates a method 500 for adjusting a battery state of charge via energy generated at an engine module of an APU, and FIG. 6 illustrates a method 600 for adjusting a temperature of engine coolant and/or lubricating oil by activating a heater module of an APU. Methods 500 and 600 may be carried out by a control unit module of an APU according to instructions stored thereon.

Referring first to method 500, at 502 the method includes determining if an indication that a primary engine has been shutdown is received. A controller of the vehicle in which the APU is installed may be in communication with the control unit of the APU. If the primary engine of the vehicle (e.g., the engine that produces the torque used to move the vehicle) is shutdown, the vehicle controller may send an indication that the engine has been shut down to the APU control unit. However, in some embodiments, the control unit of the APU may itself monitor one or more operating parameters to determine if the primary engine has been shut down. If the primary engine has not been shut down, method 500 returns.

If the primary engine has been shut down, method 500 proceeds to 504 to monitor the state of charge (SOC) of one or more vehicle batteries configured to store energy produced from the rotational motion of the primary engine. During conditions where the primary engine is shutdown, certain electrical components of the vehicle may continue to be operated via electricity from the one or more vehicle batteries. Because the primary engine is not operating, the battery charge may become depleted, limiting the time the additional electrical components can be operated without the primary engine running. As described below, if the battery state of charge is low, the APU engine may be activated and electricity generated by the alternator of the APU engine module may be stored in the one or more vehicle batteries.

The state of charge of the one or more batteries may be monitored using a suitable mechanism. In one example, when the primary engine is shutdown, various operating parameters may be monitored to determine the amount of charge drawn from the one or more vehicle batteries. Such parameters may include the load placed on the battery (such as by measuring the current and/or resistance of the battery circuit and/or by estimating the charge drawn by the various operating electrical components). The determined amount of charge drawn from the battery may be subtracted from an initial estimated battery charge (for example, it may be assumed that when the primary engine is shutdown, the battery has a charge of 90%). In another example, the SOC of the one or more batteries may be determined based on a battery SOC indication sent from the vehicle controller.

At 506, it is determined if the battery SOC is less than a threshold. The threshold battery SOC may be a suitable threshold, such as 50%. If the battery SOC is not less than the threshold, method 500 proceeds back to 504 to continue to monitor the battery SOC. If the battery SOC is less than the threshold, method 500 proceeds to 508 to activate the engine module of the APU and send the generated energy to the one or more vehicle batteries. As explained above with respect to FIG. 3, the engine module may include an engine that combusts fuel, such as diesel, and an alternator that converts the rotational motion of the engine to electricity. This electricity may be stored in the one or more vehicle batteries and/or a battery of the APU.

At 510, the battery SOC continues to be monitored. At 512, it is determined if the battery has reached a fully charged state. The battery may be fully charged when the SOC is 90% or greater in one example. If the battery is not fully charged, method 500 loops back to 510 to continue to monitor the battery SOC. To prolong the life of the battery, if the battery is fully charged, the battery may be disconnected from the APU engine module alternator at 514. Method 500 then returns.

Turning now to method 600, it also includes, at 602, determining if a primary engine has been shut down based on a signal received from a vehicle controller or other mechanism. If the engine has been shut down, at 604 method 600 includes monitoring an engine coolant and/or lubricating oil temperature. The engine coolant and/or lubricating oil temperature may be determined based on signals received from one or more temperature sensors. Alternatively or additionally, coolant and/or oil temperature may be determined based on a signal received from the vehicle controller.

At 506, it is determined if the coolant and/or oil temperature is below a first threshold, T1. The first threshold temperature may be a suitable temperature below which vehicle performance may degrade and/or fuel efficiency at a subsequent start-up may be compromised. For example, the engine coolant may be configured to be maintained at 100° F. or higher if the engine shutdown is predicted to be temporary. Then, during the subsequent start-up, the coolant will already be relatively warm, expediting warm-up of the engine and conserving fuel and reducing emissions. If the coolant and/or oil temperature is not below the first threshold, method 500 loops back to continue to monitor the coolant and/or oil temperature. If the coolant and/or oil temperature is below the first threshold, method 600 proceeds to 608 to activate the APU engine module and use the energy produced by the engine module to operate a heater module of the APU. The heater may be configured to heat the engine coolant and/or lubricating oil. Further, a pump module of the APU may be activated to pump the coolant and/or oil into or out of the heater module. At 610, the coolant and/or oil temperature continues to be monitored.

At 612, it is determined if the coolant and/or oil temperature is above a second threshold, T2. The second threshold may be a suitable temperature above which degradation to engine components may occur due to the high temperature of the coolant or oil. For example, the second threshold temperature may be 120° F. If the coolant and/or oil temperature is not above the second threshold, method 600 continues to heat the coolant and/or oil and monitor the coolant and oil temperature. If the coolant and/or oil temperature is above the second threshold, method 600 proceeds to 614 to deactivate the heater. When the heater is deactivated, the pump may also be deactivated. However, in some embodiments, the pump may continue to be operated to cool the heater. Method 600 then returns.

Thus, according to the systems and methods described above, an APU may be distributed throughout a vehicle rather than installed as a single unit in a single location. In doing so, each module of the APU may be placed into available packaging space in the vehicle, reducing the overall packaging space of the vehicle needed to house the APU. The APU control unit may monitor various parameters, such as the primary engine operation status, vehicle battery state of charge, and engine liquid temperature. Based on the parameters, the APU engine may be activated to generate electricity to charge the vehicle battery and/or maintain the engine liquid temperature at a designated temperature. The APU may be used during vehicle conditions where engine operation is not needed for traction and thus may provide auxiliary power for non-tractive engine components. In this way, the primary engine may be shut down while the non-tractive components are operated.

An embodiment relates to an auxiliary power unit. In one example, the auxiliary power unit comprises a plurality of independent modules configured to be installed in different respective locations within a vehicle, each module of the plurality of independent modules configured to carry out one or more respective functions of the auxiliary power unit for providing auxiliary power in the vehicle. As used herein, "independent module" may indicate that each module is packaged in a self-contained housing that is independent from the other modules of the APU. Further, each independent module may be separately and independently affixed in the vehicle such that removal of one module is independent from removal of any other modules and does not require removal of any other modules. Thus, while in some examples one or more of the modules may be fluidically or electrically coupled to one or more other modules, each module is maintained in a housing independent from the other modules. Further, "independent module" may alternatively or additionally indicate that the modules each have a separate function, independent from the function of the other modules of the APU. While at least some of the modules may rely on other modules to carry out a respective function (e.g., the battery of the APU may receive energy from the engine of the APU, the heater of the APU may be powered by the battery of the APU, etc.), none of the modules have overlapping functions.

The plurality of independent modules may comprise an engine module; a heater module; an oil pump module; an exhaust pipe module; and a control module. The engine module may be configured to produce energy usable by the heater and/or oil pump module, for example by combusting a fuel such as diesel in order to generate a torque output that is transmitted to an alternator of the engine module. The heater module may be configured to heat one or more engine fluids, such as oil and/or coolant. The heater module may be operated using energy produced by the engine module. The oil pump module may include a pump configured to pump engine fluid (e.g., oil and/or coolant) to and/or from the heater module. The pump may be operated by a motor that receives energy produced by the engine module via an APU battery. As such, the oil pump module also includes a battery (and, at least in some embodiments, a battery charging circuit). For example, the battery can be a 12V DC lead-acid battery, a lithium-ion battery, or other rechargeable battery. The battery may receive and energy produced by the engine module, for distribution to energy-consuming devices, such as the heater, pump, or vehicle components. The exhaust pipe module may be configured to route exhaust gas from the engine module and/or the heater module to atmosphere. The exhaust module may be in fluid communication with one or more of the heater module or the engine module. The control module may be configured to receive signals from a variety of components and sensors of the APU and/or vehicle, and may send signals controlling a variety of actuators of the APU and/or vehicle.

The engine module may comprise an engine, an alternator, and one or more vibration isolators. The exhaust pipe module may be configured to route exhaust from the engine module and/or the heater module to atmosphere. The exhaust pipe module may be configured to be fluidically coupled to the engine module and/or the heater module when the auxiliary power unit is installed in the vehicle. The engine module, heater module, and oil pump module may be each configured to communicate with the control module when the auxiliary power unit is installed in the vehicle. The engine module and control module may be configured to be coupled to a battery of the vehicle when the auxiliary power unit is installed in the vehicle.

A first module of the plurality of independent modules may be configured to be installed in a first location of the different locations that is subject to a first, higher amount of vibration when the vehicle is in operation; and a second module of the plurality of independent modules may be configured to be installed in a second location of the different locations that is subject to a second, lower amount of vibration when the vehicle is in operation.

In an example, the plurality of independent modules comprises: an engine module configured to generate electricity independent of operation of a primary engine of the vehicle; a heater module configured for coupling with at least one of one or more coolant lines or one or more oil lines, the heater module configured to maintain a temperature of at least one of engine coolant of the primary engine of the vehicle or lubricating oil of the primary engine of the vehicle; an exhaust pipe module configured to be fluidically coupled to at least the engine module for routing exhaust from the engine module to atmosphere; and a control module configured to communicate with the engine module and the heater module for controlling the engine module and the heater module. The auxiliary power unit further comprises: an auxiliary power unit battery positioned in one of the engine module, the heater module, or a separate auxiliary power unit battery module; and a pump configured to pump at least one of the engine coolant or the lubricating oil, wherein the pump is positioned in one of the heater module, the auxiliary power unit battery module, or a separate pump module.

In examples, the heater module is configured to be installed in a first location of the different locations that is subject to a first, higher amount of vibration when the vehicle is in operation, and the control module is configured to be installed in a second location of the different locations that is subject to a second, lower amount of vibration when the vehicle is in operation.

In some examples, the vehicle is a rail vehicle, such as a locomotive. In other examples, the vehicle is a tender car configured to provide fuel to the locomotive. Other vehicle types are possible, such as off- or on-highway vehicles, marine vehicles, etc. The auxiliary power unit may be configured to provide power to one or more systems of the vehicle when an engine of the vehicle is not operating.

In some examples, more than one APU may be present, for example multiple APUs may be located on a single vehicle, or two or more APUs may be distributed between two or more vehicles. The multiple APUs may have similar specifications, e.g., similar fuel source, alternator output, etc., or the different APUs may have different specifications. The two or more APUs may be operably coupled to another in some examples, for example each APU may provide energy to the same vehicle battery.

Thus, the auxiliary power unit described in the examples above may be a first auxiliary power unit comprising a plurality of independent modules configured to be installed in respective different locations within a first vehicle. A second auxiliary power unit may comprise a plurality of independent modules configured to be installed in respective different locations within a second vehicle, each module of the plurality of independent modules configured to carry out one or more respective functions of the second auxiliary power unit for providing auxiliary power in the second vehicle, the second vehicle operably coupled to the first vehicle.

The first auxiliary power unit and second auxiliary power unit may differ in one or more of engine size, alternator power output, or engine fuel source. The first auxiliary power unit may comprise a first engine module and the second auxiliary power unit comprises a second engine module, the first engine module configured to combust liquid fuel and the second engine module configured to combust gaseous fuel.

In another example, the second auxiliary power unit comprises a plurality of independent modules configured to be installed in respective different locations within the first vehicle, each module of the plurality of independent modules configured to carry out one or more respective functions of the second auxiliary power unit for providing auxiliary power in the first vehicle. The first auxiliary power unit and second auxiliary power unit may differ in one or more of engine size, alternator power output, or engine fuel source.

Another example includes a system for a vehicle, comprising a primary engine; a vehicle alternator to convert rotational energy of the primary engine to electrical energy; a vehicle battery configured to store the electrical energy from the alternator; and an auxiliary power unit. The auxiliary power unit comprises an engine module coupled to the vehicle battery and positioned in a first location, a heater module positioned in a second location, an exhaust pipe module coupled to the engine module, a control module positioned in a third location, an auxiliary power unit battery in one of the engine module, the heater module, or a separate battery module of the auxiliary power unit, and an oil pump in one of the heater module, the battery module, or a separate oil pump module of the auxiliary power unit, wherein the second location is subject to a first, higher amount of vibration and the third location is subject to a second, lower amount of vibration when the vehicle is in operation.

The first, second, and third locations may be different locations of the vehicle such that the various modules of the APU are positioned apart from each other. The modules may not be positioned in the same housing, but may be contained in separate, non-overlapping housings. Each module of the plurality of modules of the APU may be in communication (e.g., fluid and/or electrical communication, and/or operably coupled) with at least one other module of the APU and/or other vehicle components. For example, the control module may be configured to activate the engine module when a state of charge of the vehicle battery is below a threshold. In another example, the control module may be configured to activate the engine module and the heater module when an engine coolant temperature is below a threshold temperature. The vehicle may be rail vehicle such as a locomotive or tender car, or another type of vehicle.

An embodiment relates to a method, comprising: receiving an indication that a primary engine has been shut down; in response to receiving the indication, monitoring a state of charge of a vehicle battery configured to store energy produced by the primary engine; activating a secondary engine positioned in a first location in response to the state of charge being less than a threshold amount, the vehicle battery also located at the first location; sending energy produced from the secondary engine to the vehicle battery; and in response to an engine coolant temperature dropping below a threshold temperature, activating a heater positioned in a second, different location to heat the engine coolant, wherein the heater is powered by the secondary engine.

Monitoring the state of charge of the vehicle battery may comprise monitoring a load placed on the vehicle battery. Activating a heater positioned in a second, different location may comprise activating a heater positioned at a coolant system of the vehicle. The method may further comprise converting rotational motion of the secondary engine to electricity via an alternator, the alternator located at the first location.

As described above, the secondary engine is positioned at first location and the heater is positioned at a second location, different than the first location. As such, the secondary engine and the heater are not positioned in the same housing and are not positioned proximate to one another. The different locations may also be functionally and/or operationally different, such as being subject to different vibration levels, different temperatures, etc. Further, in some examples the different locations may be defined relative to locations of various vehicle components, as the secondary engine being located proximate a vehicle battery and the heater being located at a coolant system of the vehicle, as above.

As noted above, the modules may be configured for installation in certain locations of a vehicle based on respective vibration tolerances or capabilities of the modules. For example, modules with a relatively higher degree of vibration tolerance may be installed in locations in a vehicle that are subject to higher levels of nominal vibration when the vehicle is in operation, and modules with a relatively lower degree of vibration tolerance may be installed in locations in a vehicle that are subject to lower levels of nominal vibration when the vehicle is in operation. Nominal vibration refers to levels of vibration that are expected during all modes of the usual operation of a vehicle for which it is designed.

In embodiments, an auxiliary power unit comprises a plurality of modules that are configured to be installed in respective different locations within a vehicle. Each module of the plurality of modules is configured to carry out one or more respective functions of the auxiliary power unit (e.g., generating electricity, heating lubricating oil and/or engine coolant of an engine of the vehicle, said vehicle engine being an engine of the vehicle that is other than an engine of the auxiliary power unit, e.g., a traction engine) for providing auxiliary power in the vehicle. In addition to as described elsewhere herein, the different locations may defined based on, and/or installation of the modules in the different locations may be facilitated according to, one or more of: (i) different nominal vibration levels; (ii) the modules having separate and different housings, and at least two of the modules including respective electrical connection assemblies for coupling (e.g., detachably coupling with a removable plug and receptacle) communication and/or electric power lines between the modules; (iii) the shortest distance between at least two of the modules (not including electric power and/or communication lines extending between the modules) is: in one embodiment, at least one meter; in another embodiment, at least two meters; and in another embodiment, at least five meters; and/or (iv) the shortest distance between at least three of the modules (not including electric power and/or communication lines extending between the modules) is: in one embodiment, at least one meter (that is, first, second, and third modules are spaced apart each one from the others by at least one meter); in another embodiment, at least two meters (that is, first, second, and third modules are spaced apart each one from the others by at least two meters); and in another embodiment, at least five meters (that is, first, second, and third modules are spaced apart each one from the others by at least five meters). This reflects that in embodiments, at least some of the modules may be spaced apart from one another by a relatively large distance (relative to auxiliary power units where all the sub-systems of the auxiliary power unit are in a common housing), which may be advantageous for accommodating the auxiliary power unit in disparate areas/locations of a vehicle where space happens to be available and without necessarily having been specifically and originally allocated to the auxiliary power unit when the vehicle was designed and manufactured. For example, in a rail vehicle, providing an auxiliary power unit with modules (e.g., engine, heating, pump, battery, and/or control) that can be separated by one, two, five, or more meters, allows the auxiliary power unit to be placed in locations that are otherwise unused space, and without having to allocate a co-located volume for accommodating all parts of the auxiliary power unit in one location.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The invention claimed is:

1. A system comprising:
a first auxiliary power unit comprising a first plurality of independent modules configured to be installed in respective different locations within a first vehicle, each module of the first plurality of independent modules configured to carry out one or more respective functions of the first auxiliary power unit for providing auxiliary power in the first vehicle, each module of the first plurality of independent modules packaged in a respective self-contained housing that is independent from the other modules of the first plurality of independent modules; and
a second auxiliary power unit, wherein the second auxiliary power unit comprises a second plurality of independent modules configured to be installed in respective different locations within a second vehicle, each module of the second plurality of independent modules configured to carry out one or more respective functions of the second auxiliary power unit for providing auxiliary power in the second vehicle, the second vehicle configured to be operably coupled to the first vehicle, and wherein the first auxiliary power unit is configured to generate electricity to store in a vehicle battery and the second auxiliary power unit is configured to generate energy to power a regasification unit or a cryogenic unit.

2. The system of claim 1, wherein the first plurality of independent modules comprises:
an engine module;
a heater module;
an oil pump module;
an exhaust pipe module; and
a control module.

3. The system of claim 2, wherein the engine module comprises an engine, an alternator, and one or more vibration isolators, and wherein the oil pump module includes an oil pump module battery.

4. The system of claim 2, wherein the exhaust pipe module is configured to route exhaust from at least one of the engine module or the heater module to atmosphere.

5. The system of claim 2, wherein the exhaust pipe module is configured to be fluidically coupled to the engine module and the heater module when the first auxiliary power unit is installed in the first vehicle.

6. The system of claim 2, wherein the engine module, heater module, and oil pump module are each configured to communicate with the control module when the first auxiliary power unit is installed in the first vehicle.

7. The system of claim 2, wherein the engine module and control module are configured to be coupled to the vehicle battery when the first auxiliary power unit is installed in the first vehicle.

8. The system of claim 1, wherein each of the first vehicle and the second vehicle is a respective locomotive or a tender car.

9. The system of claim 1, wherein: a first module of the first plurality of independent modules is configured to be installed in a first location of the different locations within the first vehicle that is subject to a first, higher amount of vibration when the first vehicle is in operation; and a second module of the first plurality of independent modules is configured to be installed in a second location of the different locations within the first vehicle that is subject to a second, lower amount of vibration when the first vehicle is in operation.

10. The system of claim 1, wherein the first auxiliary power unit is configured to provide power to one or more systems of the first vehicle when an engine of the first vehicle is not operating.

11. The system of claim 1, wherein:
the first plurality of independent modules comprises:
an engine module configured to generate electricity independent of operation of a primary engine of the first vehicle;
a heater module configured for coupling with at least one of one or more coolant lines or one or more oil lines, the heater module configured to maintain a temperature of at least one of engine coolant of the primary engine of the first vehicle or lubricating oil of the primary engine of the first vehicle;
an exhaust pipe module configured to be fluidically coupled to at least the engine module for routing exhaust from the engine module to atmosphere; and
a control module configured to communicate with the engine module and the heater module for controlling the engine module and the heater module; and
the first auxiliary power unit further comprises:
an auxiliary power unit battery positioned in one of the engine module, the heater module, or a separate auxiliary power unit battery module; and
a pump configured to pump at least one of the engine coolant or the lubricating oil, wherein the pump is positioned in one of the heater module, the auxiliary power unit battery module, or a separate pump module.

12. The system of claim 11, wherein: the heater module is configured to be installed in a first location of the different locations within the first vehicle that is subject to a first, higher amount of vibration when the first vehicle is in operation; and the control module is configured to be installed in a second location of the different locations within the first vehicle that is subject to a second, lower amount of vibration when the first vehicle is in operation.

13. The auxiliary power unit of claim 1, wherein the first auxiliary power unit and second auxiliary power unit differ in one or more of engine size, alternator power output, or engine fuel source.

14. The auxiliary power unit of claim 13, wherein the first auxiliary power unit comprises a first engine module and the second auxiliary power unit comprises a second engine module, the first engine module configured to combust liquid fuel and the second engine module configured to combust gaseous fuel.

15. A system for a vehicle, comprising:
a primary engine;
a vehicle alternator configured to convert rotational energy of the primary engine to electrical energy;
a vehicle battery configured to store the electrical energy from the alternator; and
an auxiliary power unit comprising:
an engine module coupled to the vehicle battery and positioned in a first location,
a heater module positioned in a second location,
an exhaust pipe module coupled to the engine module,
a control module positioned in a third location,
an auxiliary power unit battery in a separate battery module of the auxiliary power unit, and
an oil pump in the separate battery module of the auxiliary power unit,
wherein the second location is subject to a first, higher amount of vibration and the third location is subject to a second, lower amount of vibration when the vehicle is in operation, wherein each module of the auxiliary power unit is packaged in a respective self-contained housing that is independent from the other modules, and wherein each module of the auxiliary power unit is separately and independently affixed in the vehicle.

16. The system of claim 15, wherein the vehicle is a locomotive or a tender car, and wherein each module of the auxiliary power unit is spaced apart from one another by at least a threshold distance.

17. The system of claim 16, wherein the threshold distance is one meter, and wherein the control module is configured to activate the engine module when a state of charge of the vehicle battery is below a threshold.

18. The system of claim 15, wherein the control module is configured to activate the engine module and the heater module when an engine coolant temperature is below a threshold temperature.

19. A system comprising:
a first auxiliary power unit comprising a first plurality of independent modules configured to be installed in respective different locations within a locomotive, each module of the first plurality of independent modules configured to carry out one or more respective functions of the first auxiliary power unit for providing auxiliary power in the locomotive, each module of the first plurality of independent modules packaged in a respective self-contained housing that is independent from the other modules of the first plurality of independent modules; and
a second auxiliary power unit, wherein the second auxiliary power unit comprises a second plurality of independent modules configured to be installed in respective different locations within a fuel tender, each module of the second plurality of independent modules configured to carry out one or more respective functions of the second auxiliary power unit for providing auxiliary power in the fuel tender, the fuel tender configured to be operably coupled to the locomotive, and wherein the first auxiliary power unit is configured to generate electricity to store in a vehicle battery and the second auxiliary power unit is configured to generate energy to power a regasification unit or a cryogenic unit for the fuel tender to provide fuel to the locomotive.

20. The system of claim 19, wherein the first plurality of independent modules comprises:
an engine module;
a heater module;

an oil pump module;

an exhaust pipe module; and a control module.

21. The system of claim 20, wherein the engine module comprises an engine, an alternator, and one or more vibration isolators, and wherein the oil pump module includes an oil pump module battery.

22. The system of claim 20, wherein the exhaust pipe module is configured to route exhaust from at least one of the engine module or the heater module to atmosphere.

23. The system of claim 20, wherein the exhaust pipe module is configured to be fluidically coupled to the engine module and the heater module when the first auxiliary power unit is installed in the locomotive.

24. The system of claim 20, wherein the engine module, heater module, and oil pump module are each configured to communicate with the control module when the first auxiliary power unit is installed in the locomotive.

25. The system of claim 20, wherein the engine module and control module are configured to be coupled to the vehicle battery when the first auxiliary power unit is installed in the locomotive.

26. The system of claim 19, wherein: a first module of the first plurality of independent modules is configured to be installed in a first location of the different locations within the locomotive that is subject to a first, higher amount of vibration when the locomotive is in operation; and a second module of the first plurality of independent modules is configured to be installed in a second location of the different locations within the locomotive that is subject to a second, lower amount of vibration when the locomotive is in operation.

\* \* \* \* \*